Patented July 1, 1930

1,769,792

UNITED STATES PATENT OFFICE

WILLIAM G. LEAMON, OF NEWARK, OHIO

TREATMENT OF OILS FOR IMPROVING THE SAME

No Drawing.   Application filed March 10, 1923.   Serial No. 624,268.

This invention relates to treatment of oils for improving the same; and it relates more particularly to the treatment of hydrocarbon oils, especially gasolines and other motor fuels derived from petroleum, as well as other relatively light distillates such a kerosene, said treatment being effective to remove therefrom gumming or resinifying constituents and being particularly applicable on this account to the treatment of petroleum products derived from cracking processes and containing substantial percentages of unsaturated compounds.

In this applicant's prior application Serial No. 621,076, filed February 24, 1923, there is described and claimed the treatment of gasoline and other motor fuels with a catalytic polymerizing or condensing agent dissolved in a solvent differing from the oil to be treated but miscible therewith or soluble therein especially an ether, such as ethyl ether or mononitro benzene, this treatment being effective to polymerize resinifying gum-forming constituents in the oil and enabling separation thereof in such manner as to produce oils of marked superiority as regards stability and other properties. In particular the process of said prior co-pending application is directed to the treatment of motor fuels, such as gasolines, resulting from processes of cracking heavy mineral oils and residua, such cracked motor fuels being characterized by large content of unsaturates, including polymerizable constituents that are responsible for the formation of gums or resins that manifest their presence in commercial motor fuels previously known in the art.

The catalytic polymerizing or condensing agent especially recommended in said prior application is anhydrous aluminum chlorid, although mention was made also of other agents that could be used including anhydrous zinc chlorid. At that time, however, it was not fully appreciated that zinc chlorid acted in a manner that was particularly distinctive or that resulted in special advantages over the employment of aluminum chlorid. This applicant has now discovered that zinc chlorid does in fact act differently from aluminum chlorid under parallel conditions and that the use of zinc chlorid enables the attainment of certain practical advantages that cannot be realized by the employment of aluminum chlorid.

It is also pointed out in the prior application referred to that after the motor fuel (for example) had been treated with the solution of the polymerizing or condensing agent, the motor fuel could simply be separated from any gummy or resinous polymers deposited and used directly without re-distillation, providing of course its distillation range were already such as to render it suitable for use in internal combustion engines. It was also pointed out, however, that, when using aluminum chlorid as the treating agent, such treated motor fuel was not stable, that is, it still contained resinifying polymers in solution which would deposit upon standing for a sufficient length of time or would manifest themselves upon evaporation in the usual open dish test. It was therefore recommended, for best results, that after treatment with the solution of the polymerizing or condensing agent, the motor fuel be re-distilled to eliminate the soluble polymers retained in solution in the treated motor fuel.

Further work on this general method of improving motor fuels and the like has now shown that by employing zinc chlorid, in place of aluminum chlorid, dissolved in a suitable solvent such as ether (ordinary sulfuric ether), substantially complete separation of the resinifying polymers can be effected without re-running or re-distilling the motor fuel undergoing treatment. It appears to be a peculiarity of zinc chlorid that the polymerized products resulting from its action when introduced into motor fuel even at ordinary room temperatures are promptly formed and are in a condition such that they separate and deposit, practically completely, no polymers remaining in solution in the treated motor fuel to a substantial extent. This surprising result is obviously of great technical importance in that it renders it possible to greatly simplify and shorten the treatment of all motor fuels and gasolines that do not require re-running or re-distilling to meet certain requirements such as a specified end point. Another important advantage accrues from the fact that the polymers formed when using zinc chlorid under the conditions herein especially recommended, although they are substantially insoluble in the motor fuel, are nevertheless readily removed from the tank or other receptacle in which they may be deposited simply by washing out with water. The polymers are either dissolved or decomposed by water in such manner that the tank can be completely cleaned out with the great ease as contrasted with the difficulty sometimes experienced in removing the polymers obtained when aluminum chlorid is employed as the polymerizing or condensing agent.

Still another advantage resulting from the use of zinc chlorid is that an even more minute quantity of the re-agent is necessary to effect the desired polymerization than is the case where aluminum chlorid is used. Whether this is or is not due to aluminum chlorid acting in a more drastic manner and itself entering into combination of some kind with certain of the polymers formed, and thus acting not merely as a carrier or catalytic agent, is not entirely clear at this time; but it is an observed fact that the desired results can be obtained with a materially less quantity of zinc chlorid than of anhydrous aluminum chlorid.

In order to explain more fully the principles underlying the invention by way of a concrete illustrative example, the employment of the novel process for the treatment of a motor fuel or gasoline in accordance therewith will now be described without, however, intending to limit thereby the scope of the invention. It will be assumed that the motor fuel to be treated is a distillate obtained by cracking gas oil or the like, the manufacturing process having been so conducted as to obtain a motor fuel or gasoline having the requisite distillation range required to meet commercial specifications. Such a gasoline may contain in a typical instance as much as 30 or 40 per cent of unsaturated compounds. An excellent motor fuel of this general description can be obtained for example by the process disclosed and claimed in an application filed by the present applicant November 4, 1921, Serial No. 512,894; although it is to be understood that this is merely referred to here as an example of one type of motor fuel or gasoline that can be treated with advantage by the present process. In treating such a motor fuel, it is found that as little as 0.03 per cent of anhydrous zinc chlorid, based on the weight of motor fuel to be treated, suffices to give excellent results. As stated, the zinc chlorid is used in the form of a solution in a suitable solvent that is miscible with the motor fuel, ordinary sulfuric ether being one of the best solvents for this purpose. In practice a saturated solution of zinc chlorid in ether is most convenient to employ. It is most advantageous to carry out the treatment at ordinary room temperatures without the aid of heat, although it is not to be understood that the use of moderate heating is excluded. The introduction of the ether solution of zinc chlorid into the motor fuel may be variously accomplished, but a simple and effective method is simply to spray or sprinkle the solution upon the body of motor fuel in the treating tank or container. The treating solution settles through the liquid and diffuses very rapidly without the necessity for agitating. In fact agitation does not seem to improve the character of the reaction or to be otherwise necessary. Within a very short time after the zinc chlorid solution is added, there is a noticeable deposit of resinous or gummy material on the bottom of the receptacle, and this deposit increases perceptibly in thickness for some little time. After a few hours at the most, the reaction has proceeded so far that further increase in the thickness of the deposit is not readily perceptible, and this can be taken as an indication that the action is substantially complete. The gummy matter formed precipitates substantially completely within a few hours without the use of elevated temperatures, and in practice is separated from the liquid usually within twenty-four hours after beginning of the treatment. The character of the precipitate or deposit is such that separation can be readily effected for the most part merely by decantation. The decanted or otherwise separated liquid can then be further treated to advantage by filtration through fuller's-earth, bone char, or other adsorptive filtering material. The resulting product is of good color and odor, and is stable, that is, it is substantially free from gummy or resinous content as determined by the ordinary open dish evaporation test.

In case the motor fuel to be treated is a crude motor fuel that has not been finally distilled, the method of treatment may be exactly as before with the exception that it is usually advisable to use a slightly larger amount of zinc chlorid, say around 0.04–0.05 per cent. After the polymers have been precipitated, the supernatant liquid is pumped from the treating tank into a re-run still and the final distillation of the motor fuel is conducted in the usual manner, the resulting distillate being stable and of excellent color and odor. The residue in the still, instead of being noticeably sticky and gummy as is the case where aluminum chlorid is used as the treating agent, is a limpid oil easily and safely handled in pumps and pipe lines.

It is to be understood that the practice of the invention is not limited to the employment of the particular quantities of zinc chlorid above specified, these quantities being merely typical and illustrative. In general, however, there is no need to use more than a minor fraction of 1 per cent of anhydrous zinc chlorid based on the weight of the oil to be treated.

It is found that good results are obtained also when the process is applied to the treatment of other relatively light petroleum distillates such as kerosene, for example, and the invention is therefore to be understood as broad in its scope.

While the treatment of a cracked gasoline or motor fuel has been referred to above more particularly by way of an illustrative example, the novel process can also be applied with great advantage to the treatment of ordinary "straight run" gasolines obtained by ordinary refinery methods. Such straight run gasolines as heretofore available are generally characterized by instability in greater or less degree, notwithstanding their freedom from or low content of unsaturates. Treatment of such straight run gasolines in the manner hereinabove set forth has the effect of freeing them from gumming and resinifying constituents and rendering them stable and therefore of greatly increased value in the trade.

Petroleum distillates, whether cracked or not, that have been subjected to the hereinabove described treatment require no further refining or treating to make them comply with the ordinary specifications for commercial products of this kind.

What I claim is:

1. The process of improving a mineral oil which comprises subjecting the same to the modifying action of a solution of zinc chlorid in a solvent that is miscible with said oil, and that has greater solvent action on zinc chlorid than has said oil.

2. The process of improving a petroleum distillate which comprises subjecting the same to the modifying action of a solution of zinc chlorid in a solvent that is miscible with said distillate and that has a greater solvent action on zinc chlorid than has said oil and separating resultant polymerized matter from the treated distillate.

3. The process set forth in claim 2, in which the solvent used is ether.

4. The process of improving a mineral oil motor fuel mineral oil distillate which comprises subjecting such distillate at ordinary temperatures to the action of a solution of zinc chlorid in a solvent that is miscible with said distillate and that has a greater solvent action on zinc chlorid than has said distillate until gummy matter is precipitated, separating such precipitated gummy matter, and filtering the treated distillate through adsorptive filtering material.

5. The process set forth in claim 4, further characterized by the fact that the proportion of zinc chlorid used is a minor fraction of one per cent by weight of the distillate treated, such proportion not substantially exceeding 0.05 per cent.

6. The process of improving a petroleum distillate which comprises subjecting the same to the modifying action of a solution of zinc chlorid in ethyl ether, the proportion of zinc chlorid used not substantially exceeding 0.05 per cent by weight of the distillate treated.

7. The process of producing a stable motor fuel which comprises subjecting a crude motor fuel containing up to about 40 per cent of unsaturates to the polymerizing action of less than 1 per cent of zinc chlorid dissolved in ethyl ether, said motor fuel having been derived from petroleum oil by suitable heat treatment, and distilling a substantially stable motor fuel product from the crude motor fuel thus treated.

8. The process of improving a mineral oil motor fuel distillate which comprises subjecting such mineral oil distillate to the action of a solution of zinc chlorid in a solvent that is miscible with said distillate and that has greater solvent action on zinc chlorid than has said distillate, and filtering the treated distillate through adsorptive filtering material.

9. The process as set forth in claim 8 in which the solvent used is ether.

In testimony whereof I hereunto affix my signature.

WILLIAM G. LEAMON.